US011810042B1

(12) United States Patent
Csabi et al.

(10) Patent No.: US 11,810,042 B1
(45) Date of Patent: Nov. 7, 2023

(54) DISCLOSURE QUALITY ASSURANCE

(71) Applicant: UIPCO, LLC, San Antonio, TX (US)

(72) Inventors: Rachel Elizabeth Csabi, Frisco, TX (US); Hollie Ilene King, Frisco, TX (US); Victor Kwak, Frisco, TX (US); Zachery C. Lake, Aubrey, TX (US); Yogen Rai, Plano, TX (US); Samantha Elizabeth Taylor, Frisco, TX (US); Nicholas C. Wheeler, The Colony, TX (US)

(73) Assignee: United Services Automobile Association, San Antonio, TX (US)

( * ) Notice: Subject to any disclaimer, the term of this patent is extended or adjusted under 35 U.S.C. 154(b) by 43 days.

(21) Appl. No.: 17/085,447

(22) Filed: Oct. 30, 2020

Related U.S. Application Data (60) Provisional application No. 62/929,319, filed on Nov. 1, 2019.

(51) Int. Cl.
*G06Q 10/0639* (2023.01)
*G06Q 30/016* (2023.01)
(Continued)

(52) U.S. Cl.
CPC ......... *G06Q 10/06398* (2013.01); *G06F 3/14* (2013.01); *G06F 3/16* (2013.01);
(Continued)

(58) Field of Classification Search
CPC ......... G06Q 10/0633; G06Q 10/06395; G06Q 10/107; G06Q 10/06398; G06Q 30/016; G06N 20/00; G06F 3/16; G06F 3/14
(Continued)

(56) References Cited

U.S. PATENT DOCUMENTS

| | | | |
|---|---|---|---|
| 10,210,861 B1 * | 2/2019 | Arel | G10L 15/1815 |
| 11,133,010 B1 * | 9/2021 | Waldmeier | G06F 40/284 |

(Continued)

FOREIGN PATENT DOCUMENTS

WO  WO-2009029802 A2 *  3/2009  ............. G06Q 10/10

OTHER PUBLICATIONS

Woydack, J., & Lockwood, J. (2017). "Scripts Are Beautiful": Managers' and Agents' Views of Script Use in Call Centers. (Year: 2017).*

*Primary Examiner* — Rutao Wu
*Assistant Examiner* — Letoria G Knight
(74) *Attorney, Agent, or Firm* — Fletcher Yoder, P.C.

(57) ABSTRACT

A customer service system that includes a customer device associated with a customer, an agent device associated with an agent, and a monitoring system. The monitoring system includes a memory that stores instructions and a processor that executes the instructions. The instructions, when executed by the processor, cause the monitoring system to monitor a conversation between the customer device and the agent device to identify a context of the conversation. Moreover, the instructions cause the monitoring system to identify a disclosure notice based at least part on the context of the conversation, in which the disclosure notice comprises an indication of a disclosure to be read in light of the context of the conversation. Furthermore, the instructions cause the monitoring system to provide the disclosure notice to the agent, by rendering the disclosure notice in a graphical user interface (GUI) of the agent device, monitor and evaluate a disclosure provision of the disclosure notice from the agent to the customer, and provide disclosure provision feedback regarding evaluation of the disclosure provision to the agent.

19 Claims, 5 Drawing Sheets

(51) Int. Cl.
*G06F 3/14* (2006.01)
*G06N 20/00* (2019.01)
*G06F 3/16* (2006.01)
*G06Q 10/107* (2023.01)

(52) U.S. Cl.
CPC .......... *G06N 20/00* (2019.01); *G06Q 10/107* (2013.01); *G06Q 30/016* (2013.01)

(58) Field of Classification Search
USPC ................ 705/7, 305, 9; 707/6; 700/94
See application file for complete search history.

(56) References Cited

U.S. PATENT DOCUMENTS

| | | | |
|---|---|---|---|
| 11,190,641 B1* | 11/2021 | Shukla | G06F 40/279 |
| 11,194,973 B1* | 12/2021 | Goel | G06F 40/289 |
| 2006/0265090 A1* | 11/2006 | Conway | H04M 3/5175 |
| | | | 700/94 |
| 2013/0016823 A1* | 1/2013 | Odinak | H04M 3/5235 |
| | | | 379/265.02 |
| 2016/0036975 A1* | 2/2016 | O'Connor | H04M 3/5141 |
| | | | 379/265.09 |
| 2016/0314396 A1* | 10/2016 | Sneyders | H04M 3/5166 |
| 2019/0155905 A1* | 5/2019 | Bachrach | G06N 3/0454 |
| 2019/0253558 A1* | 8/2019 | Haukioja | G10L 15/22 |
| 2020/0351405 A1* | 11/2020 | Pace | H04L 51/02 |
| 2021/0103635 A1* | 4/2021 | Liao | G06N 3/08 |
| 2021/0158234 A1* | 5/2021 | Sivasubramanian | G10L 15/26 |

\* cited by examiner

YOU SCORED: — 66

- 90% ON DISCLOSURE READING FOR THE LAST CALL. — 70

AREAS OF IMPROVEMENT: — 72

–READ SLOWER
　　–DO NOT SKIP WORDS
　　　⋮

SCORE DETAILS: — 74

–READ WORDS AT 2 WORDS PER SECOND.
　　–SKIPPED 6 KEYWORDS AND 10 TOTAL WORDS.
　　　⋮

DISCLOSURE QUALITY ASSURANCE

CROSS-REFERENCE TO RELATED APPLICATIONS

This application claims priority to and the benefit of U.S. Provisional Application No. 62/929,319, filed Nov. 1, 2019, and entitled, "DISCLOSURE QUALITY ASSURANCE," which is incorporated herein by reference in its entirety for all purposes.

BACKGROUND

The present disclosure relates generally to disclosure statements. More specifically, the present disclosure relates to providing and/or rating context dependent disclosure statements to a customer.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Most business organizations include a service in which a customer may contact a business agent to address their questions and concerns. The service may allow the customer to contact the business agent via multiple communication methods, such as by e-mail, telephone, text, and/or online chat. The telephone communication may involve the agent actively listening to the customer and reading one or more disclosures that correspond to the conversation. By way of example, the agent may read a default disclosure at the onset of the conversation, in which the disclosure may indicate that the conversation will be recorded. However, as the conversation progresses, the agent may read additional disclosures to the customer based on the context of the conversation. Each of the additional disclosures may be associated with one or more conversation topics. As such, improved systems and methods for efficiently and effectively determining disclosure statements to be provided to the customer based on the context of the conversation may be beneficial.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, business organizations may often offer a customer service in which a customer may communicate with a customer service agent to address questions or concerns regarding the business organization. One method of communication may include the customer calling a contact service number to speak with the agent (e.g., administrative agent and/or a computer generated intelligent virtual agent).

During the call, the agent may read one or more disclosures to the customer. The disclosure may be generic and/or context specific. For example, regardless of the topic, the agent may initially read a disclosure indicating that the conversation may be recorded, the customer may be contacted in the future regarding the call, and so forth. However, the customer may be concerned with a particular topic of conversation and the topic may be one in which the business organization wants the agent to read a particular disclosure. Moreover, the conversation topic may include subtopics, such that additional disclosures associated with the subtopics should also be read by the agent.

To read the particular disclosures to the customer, the agent may search through a library of disclosures. The library may be sorted by topic and/or subtopics, and as such, the agent may have to search through multiple layers or folders within the library to locate the particular disclosures. During this search time, the customer may discuss additional topics resulting in additional disclosures to be read. The search time may also be time consuming and take away from the customer-agent conversation, resulting in a less interactive conversation. Further, in some instances disclosures may be overlooked, as customer service representatives may be unaware of particular disclosures that should be provided based upon the context of the call.

Accordingly, it is now appreciated that there is a need to efficiently and accurately determine the one or more particular disclosures based on contextual information of the conversation topic to reduce or eliminate the time used to provide the disclosures. However, determining the relevant context used to efficiently and accurately determine the particular disclosures may be difficult to implement in practice.

Figure 1:
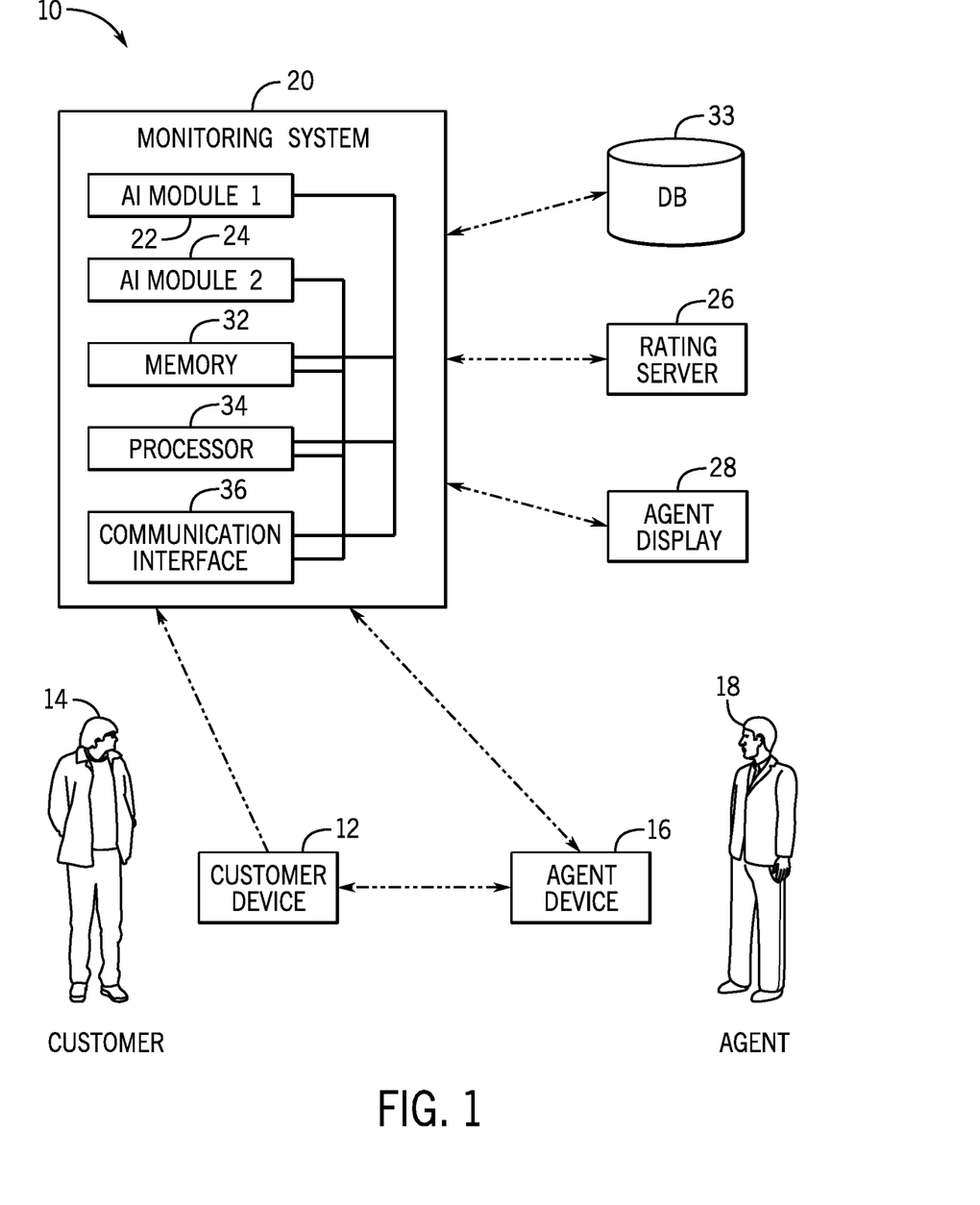
FIG. 1 illustrates a block diagram of an embodiment of a customer service system that employs the disclosure provision techniques described herein, in accordance with embodiments described herein.

With the foregoing in mind, FIG. 1 illustrates a block diagram of a customer service architecture 10. As shown, the customer service architecture 10 may include a customer device 12 that is associated with a customer 14, an agent device 16 that is associated with an agent 18, and a monitoring system 20. The customer device 12 and the agent device 16 may include a wireless phone, a tablet, a computer, such as a laptop or personal computer, and the like, that are capable of receiving and transmitting wireless signals over a wireless network. Although the following descriptions discuss the customer device 12 and the agent device 16 communicating using a telecommunication service, which represents a particular embodiment, it should be noted that the methods and systems described herein may also be performed and implemented with communication over text, e-mail, online chat, and so forth.

The customer device 12 and the agent device 16 may be capable of receiving and transmitting wireless signals and messages over cellular towers, satellites, or other suitable telecommunication mediums. Accordingly, and as shown, the customer device 12 and the agent device 16 may communicate with each other via wireless signals. The monitoring system 20 may be communicatively coupled to the customer device 12. In some embodiments, upon the agent device 16 connecting to the customer device 12, the monitoring system 20 may also communicatively couple to the customer device 12 (or otherwise monitor communications between the customer device 12 and the agent device 16). The monitoring system 20 may monitor a conversation occurring between the agent device 16 and the customer device 12 as soon as the connection between the devices is made (e.g., telecommunication connection is made between both devices). In some embodiments, the monitoring system 20 may also monitor and/or utilize additional correspondence from the customer device 12, such as texts, emails, and/or online chat messages that occur in addition to the ongoing customer-agent conversation (e.g., correspondence from a prior customer-agent conversation). For example, the monitoring system 20 may record and store an identification (I.D.) associated with the customer device 12 (e.g., I.D. when the customer device contacts or calls the customer service number to connect to the agent device 16) and correspondence associated with the I.D. If additional correspondence exists for the particular customer device 12, the monitoring system 20 may retrieve the additional correspondence based on the customer device's I.D. The additional correspondence from the particular customer device 12 may be used as additional data to determine a disclosure notice and/or disclosure provision feedback. For example, the additional correspondence may be used to streamline the search for the disclosure notice and/or be used to predict the disclosure notice prior to using conversation data (e.g., ongoing and/or real-time conversation data) to confirm the predicted disclosure notice.

The monitoring system 20 may include a first artificial intelligence (AI) module 22 and a second AI module 24. In some embodiments, the first AI module 22 and the second AI module 24 may be integrated into a single AI module. The first AI module 22 may be used to determine the disclosure notice to display on an agent display 28 (e.g., graphical user interface (GUI)) (e.g., based upon a call context), while the second AI module 24 may be used to determine corresponding disclosure provision feedback to display on the agent display 28. In some embodiments, the agent display 28 may be integrated with the agent device 16. As will be discussed in detail with respect to FIG. 5, the first AI module 22 may use machine learning to determine disclosures that may be pertinent to a current context of the communications and display an indication of these disclosures to the agent 18 (e.g., via the agent device 16 and/or the agent display 28), based at least in part upon the context of the customer-agent conversation. Similarly, and as will be discussed in detail with respect to FIG. 6, the second AI module 24 may use machine learning to determine disclosure provision feedback based on the agent's 18 reading of the disclosure. The AI modules 22 and 24 may be communicatively coupled to or integrated with a memory 32 and/or a processor 34. The processor 34 may process stored data that is stored in the memory 32 and/or a third party database 33 to train the AI modules 22 and 24. The stored data may include historical data of previous customer-agent conversations and corresponding disclosure statements. In some embodiments, the stored data may also include data of previously read disclosure notices and their associated provision feedback.

The processor 34 may include any type of processing circuitry, such as one or more processors, one or more "general-purpose" microprocessors, one or more special-purpose microprocessors, and/or one or more application specific integrated circuits (ASICS), or some combination thereof. For example, the processor 34 may include one or more reduced instruction set (RISC) processors. The processor 34 may process instructions stored in the memory 32 and/or the database 33 to determine the context dependent disclosure notices and/or the disclosure provision feedback.

The memory 32 and/or the database 33 may be configured to store instructions, data, and/or information, such as a machine learning algorithm for determining the disclosure notice and/or the disclosure provision feedback based on stored data (e.g., historical data) and/or received data (e.g., audio recording of the ongoing customer-agent conversation). The memory 32 and/or the database 33 may also store an algorithm for performing speech recognition. Specifically, the algorithm may cause the processor 34 to enable an analog-to-digital converter (ADC) (not shown) of the monitoring system 20 to translate analog speech to digital data (e.g., readable computer data or text for the processor 34). In some embodiments, the ADC converter may translate speech for various accents and languages. By way of example, the agent 18 generates analog waves (e.g., vibrations in air) when speaking, and the ADC may translate these waves into digital data for computer processing. The ADC digitizes the speech sounds (e.g., digital signal) by taking measurements of the waves at intervals, filtering the digitized signal to remove noise, and/or separating the waves into different frequency bands. The ADC may also normalize the sound, for example, but adjusting the speed of the sound to a known template sound.

The algorithm may also cause the processor 34 to divide the digital signal into small segments (e.g., a second, a thousandth of a second, and so forth), referred to as phonemes, which includes the sounds made to form an expression (e.g., forty phonemes in English). The processor 34 may determine one or more words the agent 18 is speaking based on the phenomes in the context of other phenomes, using statistical models (e.g., Hidden Markov Model and neural networks) and rules, training data (e.g., machine learning), and libraries of known words, phrases, and sentences. In response to determining the one or more words, the processor 34 may output a computer command (e.g., a text of the word) indicating the one or more words spoken by the agent 18.

The memory 32 and/or the database 33 may also store a library of disclosures and/or an indication of their associated conversation topics and/or subtopics. In some embodiments, the disclosures may be tagged or include metadata indicating their associated conversation topic. Moreover, in some embodiments, the memory 32 and/or the database 33 may also include a word dictionary and/or a thesaurus that may be referenced by the machine learning algorithm when determining disclosure provision feedback. For example, if the agent 18 substitutes a word when reading the disclosure notice, then the machine learning algorithm may reference the word dictionary and/or thesaurus to determine whether the substitute word choice provides the same or similar effect as the original word. The machine learning algorithm may use this information to determine the disclosure provision feedback.

Furthermore, in some embodiments, the memory 32 and/or the database 33 may also store a score for each disclosure read by the agent 18, recommendations for the agent 18 to improve the score, historical score data for each disclosure reading by the agent 18, and so forth. Additionally, the memory 32 and/or the database 33 may also store the additional correspondence associated with the customer's I.D. (e.g., email, text, and/or online chat data). The memory 32 may be a tangible, non-transitory, computer-readable medium that stores the instructions executable by the processor 34. Thus, in some embodiments, the memory 32 may include random access memory (RAM), read only memory (ROM), rewritable non-volatile memory, flash memory, hard drives, optical discs, and the like.

Moreover, in some embodiments, the monitoring system 20 may be communicatively coupled to and/or include a communication interface 36 that may enable communication with any suitable communication network, such as wiring terminals, a cellular network, a Wi-Fi network, a personal area network (PAN), a local area network (LAN), a wide area network (WAN), and/or the like. For example, the communication interface 36 may enable the monitoring system 20 to communicate with the agent display 28, a GUI implemented on the agent device 16, and/or a GUI implemented on the customer device 12 that may also be communicatively coupled to the communication interface 36. In some embodiments, the communication interface 36 may also include communication sensors, such as an audio sensor and/or a display sensor (e.g., screen detector). The audio sensor (e.g., microphone) may be used to detect and/or record the audio communication of the customer-agent conversation. The monitoring system 20 (e.g., the processor 34) may use this data to determine the disclosure notice to transmit to the agent display 28. Simultaneously or consecutively, the display detector may be used to detect the display on the agent display 28. For example, the monitoring system 20 may detect the disclosure notice transmitted to and displayed on the agent display 28 using the display detector.

In some embodiments, the monitoring system 20 may be communicatively coupled to or integrated with a rating server 26. In particular, the rating server 26 may be used in conjunction with the second AI module 24 to determine the disclosure provision feedback for the agent 18. As will be discussed in detail with respect to FIG. 6, the rating server 26 may determine a quality of a disclosure provision (e.g., whether the disclosure provision has a passing score or a failing score) based on the agent's reading of the disclosure notice. In some embodiments, the rating server 26 may also provide a percentage score to precisely indicate the passing score or the failing score. Additionally or alternatively, the rating server 26 may provide a recommendation based on the score. For example, if the agent 18 receives a failing score, the rating server 26 may provide the recommendation addressing the basis for the failing score (e.g., not properly annunciating words within a threshold annunciation).

Figure 2:
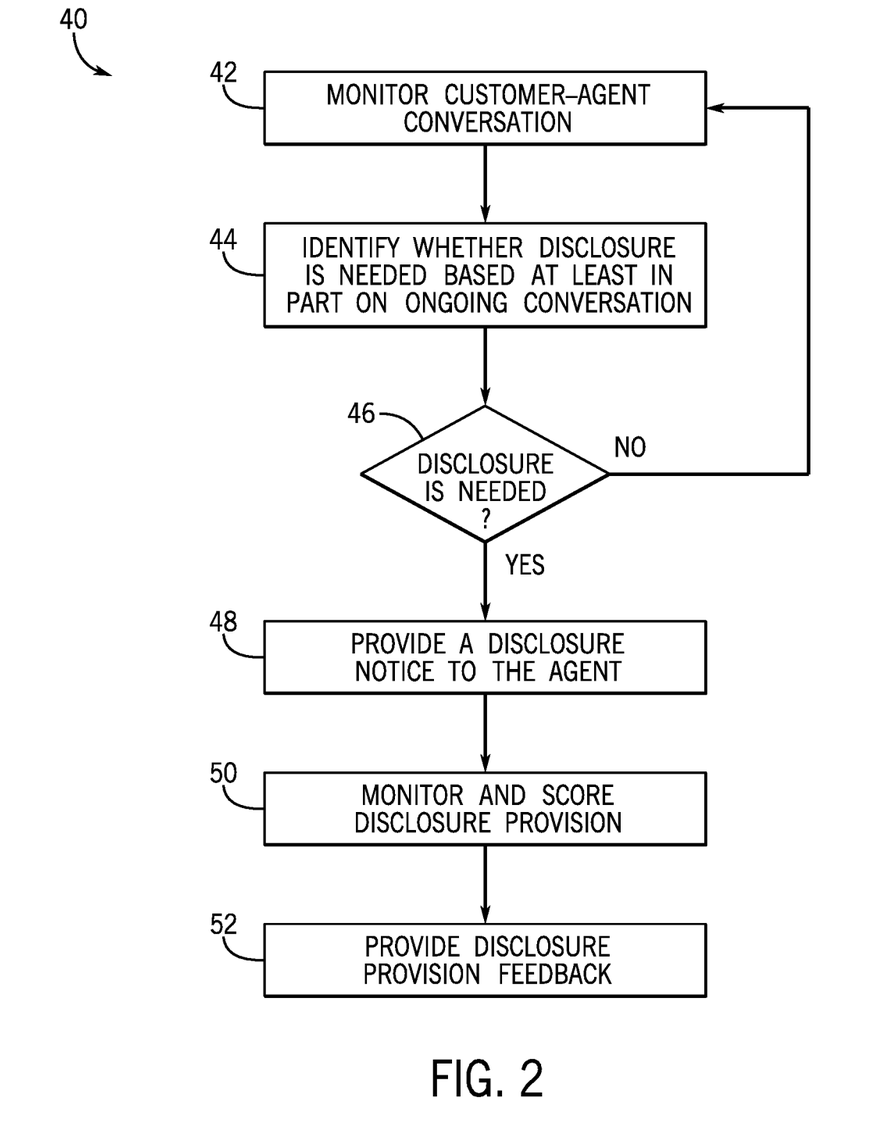
FIG. 2 illustrates a flow chart of a method for determining a disclosure notice and a corresponding disclosure provision feedback, in accordance with embodiments described herein.

Turning to a discussion of a process for determining the disclosure notice based on the customer-agent conversation, FIG. 2 illustrates a flow chart of a process 40 for determining a context dependent disclosure notice. Although the following descriptions discuss providing the single disclosure notice, which represents a particular embodiment, it should be appreciated that the methods and systems provided herein may also provide a greater number (e.g., two, four, and fifteen) disclosure notices. It should also be noted that although the process 40 is described below in a particular order, it should be understood that the process 40 may be performed in any suitable order.

Moreover, the process and steps of FIG. 2 may be implemented at least in part by executing instructions stored in a tangible, non-transitory, computer-readable medium, such as the memory 32 of the monitoring system 20, using processing circuitry, such as the processor 34 of the monitoring system 20. Furthermore, the process and steps may also be implemented by or in conjunction with the first AI module 22 and/or the second AI module 24, as will be discussed in detail with respect to FIG. 5 and FIG. 6. Specifically, process blocks 42, 44, 46, and 48 may be performed by the first AI module 22 while process blocks 50 and 52 may be performed by the second AI module 24. Accordingly, the process and steps of FIG. 2 may be generally performed or controlled by the monitoring system 20.

With the preceding in mind, FIG. 2 depicts the process 40 beginning with the monitoring system 20 monitoring (block 42) the customer-agent conversation. As previously mentioned, as soon as the customer 14 is connected to the agent 18, such as by a telephonic connection, the monitoring system 20 may begin monitoring the conversation. In some embodiments, the conversation may include the audio of the ongoing conversation and/or the recording of the conversation. However, the business organization may also provide additional customer services, and the monitoring system 20 may also begin monitoring such services upon the connection made between the customer 14 and the agent 18. For example, if the additional customer services include the customer 14 being able to communicate with the agent 18 via an online chat on the customer device 12, the monitoring system 20 may also monitor the customer-agent chat upon the chat connection. Similar monitoring may occur for other customer-agent connections (e.g., email, text, etc.).

Next, the monitoring system 20 may identify (block 44) whether a disclosure is needed based at least in part on the context of the conversation. For example, based on the conversation, the monitoring system 20 may identify conversation topics taking place and provide the corresponding disclosure notice to the agent display 28 for the agent 18 to read it to the customer 14. In some embodiments, the context may be identified in part upon words and/or patterns of words spoken by the customer 14 and/or agent 18. In some embodiments, actions invoked on the agent display 28 and/or the agent device 16 may indicate the context. For example, if the agent 18 pulls up a graphical user interface screen indicating a particular action is going to be performed, this may be used as an indication of the call context.

Figure 3:
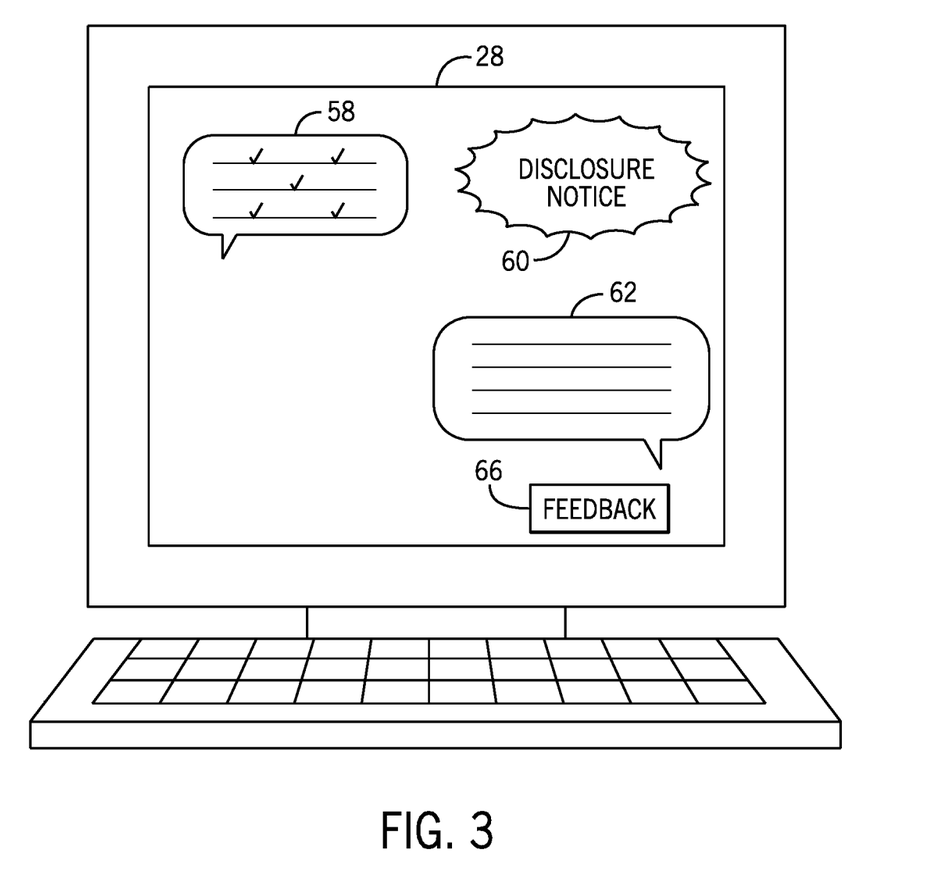
FIG. 3 illustrates a block diagram of a graphical user interface displaying the disclosure notice and the corresponding disclosure provision feedback, in accordance with embodiments described herein.

To illustrate FIG. 3 depicts a block diagram of the customer-agent conversation and the disclosure notice on the agent display 28. As shown, and in some embodiments, a conversation dialog box 58, a disclosure notice 60 (e.g., statement), and a disclosure reading 62 may be displayed on the agent display 28. The conversation dialog box 58 may be representative of any type of conversation between the customer 14 and the agent 18. For example, the conversation dialog box 58 may be populated with words corresponding to audio of the ongoing or recorded customer-agent conversation. In other embodiments, the monitoring system 20 may process the audio of the conversation without displaying the conversation dialog box 58 on the agent display 28. In either case, the monitoring system 20 may determine the disclosure notice 60 to transmit to the agent display 28 based on one or more factors when analyzing the conversation. In some embodiments, the monitoring system 20 may also analyze other types of conversation, such as text and/or images communicated via email, text, and/or chat messages.

The monitoring system 20 may consider factors that are indicative of a topic associated with the business organization, including but not limited to, one or more keywords, weight associated with the one or more keywords, spacing between the one or more keywords (e.g., other words between the keywords), and so forth. As the one or more keywords are monitored and/or recorded, the monitoring system 20 may pinpoint (indicated by checkmarks) the keywords in the conversation dialog box 58. The keywords may be predetermined based on tags and/or machine learning algorithms, as will be described with respect to FIG. 5. In some embodiments, the machine learning algorithm may identify the disclosure notice 60 based on a pattern. The pattern may include a threshold number of keywords and/or a weight of the keywords and/or a combination of keywords in the conversation. In some embodiments, keyword patterns may be used. By way of example, if the keyword "fraud" is used more than once within a twenty word threshold of words and/or the keyword "fraud" is given a relatively greater weight than other words spoken, the monitoring system 20 may learn to identify the conversation as associated with a topic of fraud. Similarly, if the keyword "fraud" is used with the keyword "account" within the same conversation, the monitoring system 20 may learn to identify the conversation as associated with the subtopic of account fraud.

Returning to FIG. 2, after determining the topic and/or subtopic, the monitoring system 20 may determine whether (decision block 46) a disclosure notice 60 should be provided. These disclosures may be identified by looking up the topic and/or subtopic in a table to see if associated disclosures exist with regard to the topic and/or subtopic. If a disclosure notice 60 should not be provided (e.g., no disclosures associated with the topic and/or subtopic in the table), then the process 40 may return to monitoring (block 42) the customer-agent conversation. For example, the keywords may indicate that the customer 14 is not discussing a specific topic and/or that the keywords are within or below a predetermined threshold as determined by the machine learning algorithm. In such instances, the monitoring system 20 may either continue monitoring the conversation without transmitting a disclosure notice 60 to the agent display 28 and/or transmit a context-generic (e.g., not context specific to the conversation) disclosure notice 60 to the agent display 28.

On the other hand, if the monitoring system 20 determines that the disclosure notice 60 should be provided (e.g., there are disclosures associated with the topic and/or subtopic in the table), then the monitoring system 20 may provide (block 48) the disclosure notice 60 to the agent display 28. In some embodiments, the monitoring system 20 may determine that multiple disclosure notices 60 should be provided (e.g., as illustrated in the GUI of FIG. 3) based on the conversation topics as indicated by the keywords. Accordingly, the monitoring system 20 may provide the multiple disclosure notices 60 of the respective conversation topics to the agent display 28.

After receiving the disclosure notice 60, the agent 18 may read the disclosure notice 60 to the customer 14. During and after the disclosure notice 60 is read, the monitoring system 20 may monitor (block 50) and evaluate (e.g., score) a disclosure reading 62 (e.g., disclosure provision), which may be indicative of a determined or expected effectiveness of the reading of the disclosure notice 60 to the customer 14. That is, the disclosure reading 62 may indicate the agent's delivery of the disclosure notice 60. The disclosure reading 62 may be compared to a determined or expected comprehension and/or understanding level of the material and subject matter of the disclosure notice 60 for the customer 14. For example, the monitoring system 20 may monitor and score the disclosure reading 62 based on one or more factors that indicate effective reading of the disclosure notice 60 (e.g., understanding measurement). The factors that indicate an effective reading may include but are not limited to, a reading of one or more keywords, annunciation of the one or more keywords, percentage or number of words read from total number of words in the disclosure notice 60, percentage or number of substituted words that provide the same or similar effect as original words, and so forth. In some embodiments, these factors may also be associated with a weight, such that some factors are more heavily weighted in determining an effective reading than other factors. These factors and/or their weights may be determined by machine learning, as will be described in detail with respect to FIG. 6. In some embodiments, the factors indicating an effective reading may be based on an action performed by the customer 14 after the disclosure reading. By way of example, the action may include the customer's 14 input in a customer survey after the conversation that indicates that the customer 14 understood the material and subject matter of the disclosure notice 60.

To illustrate, and returning back to FIG. 3, the disclosure notice 60 and the disclosure reading 62 may be displayed on the agent display 28. While the disclosure notice 60 is read and/or subsequent to the completion of the reading (e.g., finish reading at least one word of a last sentence of the disclosure notice 60), the monitoring system 20 may display and monitor the disclosure reading 62 on the agent display 28. In this manner, the agent 18 may also monitor the reading alongside the monitoring system 20. Thus, the agent 18 may review the disclosure reading 62 and then read portions of the disclosure notice 60 that were skipped prior to ending the conversation.

As previously mentioned, the monitoring system 20 may communicate with the rating server 26 of FIG. 1 to determine the score for the disclosure reading 62. In some embodiments, the score may be a pass or a fail score. Additionally or alternatively to the pass score or the fail score, the score may include the individual scores and/or score details for each factor that was used to determine the pass or fail score.

Returning to FIG. 2, the process 40 may include the monitoring system 20 to provide (block 52) disclosure provision feedback. Specifically, the monitoring system 20 may provide recommendations and/or details pertaining to the monitoring and scoring of the disclosure provision. By way of example, FIG. 3 illustrates the agent display 28 to include disclosure provision feedback 66. The disclosure provision feedback 66 may include another dialog box or a list that indicates the agent's 18 performance for each factor indicating an effective reading, a reasoning for the agent's 18 performance for each of the factors, and/or suggestions to improve the overall score and/or performance for each of the factors.

Figure 4:
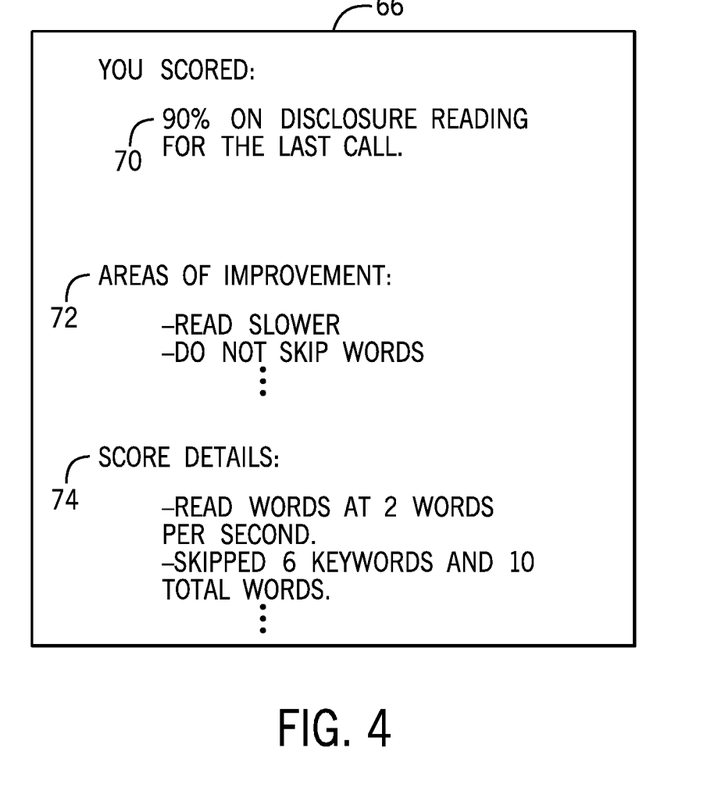
FIG. 4 illustrates a block diagram of the graphical user interface displaying details of the disclosure provision feedback of FIG. 3, in accordance with embodiments described herein.

To illustrate, FIG. 4 depicts the agent display 28 displaying details of the disclosure provision feedback 66. As shown, the disclosure provision feedback 66 indicates a score 70 for the disclosure reading 62 of FIG. 3, a recommendation 72, and a score detail 74. In the depicted embodiment, the agent 18 receives a score 70 of 90% for the disclosure reading 62, which may be an overall score 70 for the entire disclosure notice 60. In some embodiments, a passing score may be indicated by a percentage greater than a threshold (e.g., greater than 69%) and a failing score may be indicated by a percentage less than the threshold (e.g., 69% or less). In other embodiments, the score 70 may be selectable, such that the score 70 (e.g., 90%) may be selected by the agent 18. Upon selection, the score 70 may expand and indicate individual scores 70 for each factor that is considered when determining the overall score 70. Additionally or alternatively to the percentage scoring, the score 70 may be a pass or fail indication. In such instances, the pass or fail indication may also be selectable for review of individual pass or fail scores 70 for each of the factors.

In some embodiments, the monitoring system 20 may provide historical information associated with prior scores for the agent 18. For example, the agent display 28 may display one or more prior scores from one or more prior calls and/or a difference between the current score 70 and the prior score. In some embodiments, the agent display 28 may display a comparison between the current score and a statistical parameter (e.g., mean, median, mode, etc.) associated with the one or more prior scores for the agent 18 (e.g., and in chronological order). Additionally or alternatively, the agent display 28 may display a graphical representation of the current score 70 and/or prior scores of the agent 18. In this manner, the monitoring system 20 may enable tracking of the performance of the agent 18 in providing disclosure provisions over time.

The recommendation 72 may include areas of improvement based on the overall score 70 and/or individual scores 70 for each of the factors. For example, if the score 70 indicates a failing score, the monitoring system 20 may determine a reason for the failing score 70 based at least in part on one particular factor (e.g., speed of reading) and provide a corresponding suggestion to improve the reading (e.g., read at a speed slower than the conversation). In instances where the agent 18 receives an overall passing score 70, the monitoring system may still provide a suggestion to improve the scores 70 for the individual factors that brought down the overall score 70 or received a failing score 70. Additionally or alternatively to the suggestions to improve, the monitoring system 20 may provide the recommendation 72 to continue performing in the same manner (e.g., read at same speed as the conversation) when the particular factor has a passing individual score 70. The areas for improvement or suggestions of the recommendation 72 may correspond to the score detail 74.

In particular, the score detail 74 may include a detailed analysis of the agent's 18 reading for each factor that resulted in the score 70. The score detail 74 may include an analysis of the disclosure reading 62 of the one or more keywords, the reading of the keywords given a particular weight, the annunciation of the one or more keywords, the percentage or number of words read from the total number of words in the disclosure notice 60, the percentage of substituted words, the number of filler words (e.g., "um", "uh", "like", etc.) and so forth. For example, the details may indicate the specific speed of the words and/or keywords when reading the disclosure notice 60, whether the annunciation is pronounced within an expected annunciation (e.g., a threshold indicating annunciation clarity), the words that were skipped and/or their weight, and so forth.

Figure 5:
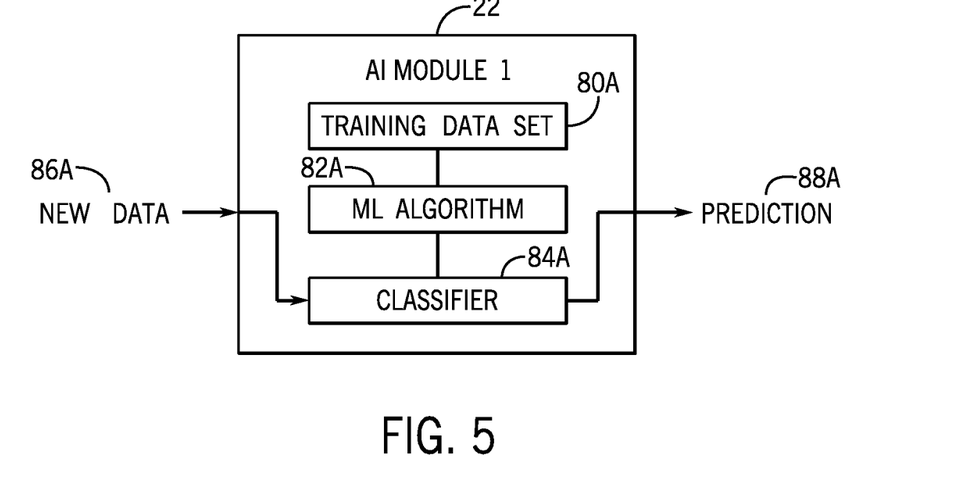
FIG. 5 illustrates a block diagram of a first artificial intelligence module for determining the disclosure notice, in accordance with embodiments described herein.

FIG. 5 illustrates the first AI module 22 of FIG. 1 for determining the disclosure notice 60. As previously mentioned, the monitoring system 20 may use the first AI module 22 to determine the disclosure notice 60 to transmit to the agent display 28. The first AI module 22 may make this determination based on a machine learning algorithm, which performs an analysis to make the determination without using explicit instructions. Instead, machine learning relies on patterns and inferences.

Specifically, the machine learning algorithm uses a mathematical or statistical model based on training data (e.g., historical data) in order to make the predictions. As shown, the first AI module 22 may include a training data set 80A, a machine learning algorithm 82A, and a classifier 84A. The training data set 80A may include historical or past customer-agent conversations that resulted in the agent 18 reading a particular disclosure notice 60 to the customer 14. As will be appreciated, the training data set 80A may be based on conversations between a plurality of agents and a plurality of customers. The amount of data for the training data set 80A may include at least one customer-agent conversation for each disclosure notice 60 in the library of disclosures, but most likely will include a sufficient number of conversations with associated disclosures to enable the machine learning algorithm to discern conversation patterns that resulted in the reading of the disclosure. In this manner, rules do not need to be hard coded into the system. This may lead to more flexibility, as customers oftentimes do not express topics and/or subtopics using rigid verbal constructs.

To facilitate determining the disclosure notice 60, the first AI module 22 may use the training data set 80A to train the machine learning algorithm 82A. During this training phase, the machine learning algorithm 82A may use mathematical and/or statistical models to identify patterns and/or thresholds in the training data set 80A that associated particular factors (e.g., words and/or combination of words) in the customer-agent conversations that resulted in providing the particular disclosure notices 60.

The classifier 84A may use the machine learning algorithm 82A that has been trained to identify patterns in the customer-agent conversations to determine whether the disclosure notice 60 should be provided to the agent display 28. Upon receiving new data 86A, which may include data associated with the ongoing customer-agent conversation (e.g., audio recording), the classifier 84A may identify the same or similar patterns to classify the customer-agent conversation. That is, based on the factors (e.g., words and/or combination of words) identified in the new data 86A, the classifier 84A may output a prediction 88A of the particular disclosure notice 60. For example, the classifier 84A may predict that the new data 86A is associated with a disclosure class or disclosure topic and/or subclass or subtopic. The prediction 88A may include the corresponding disclosure notice 60.

Figure 6:
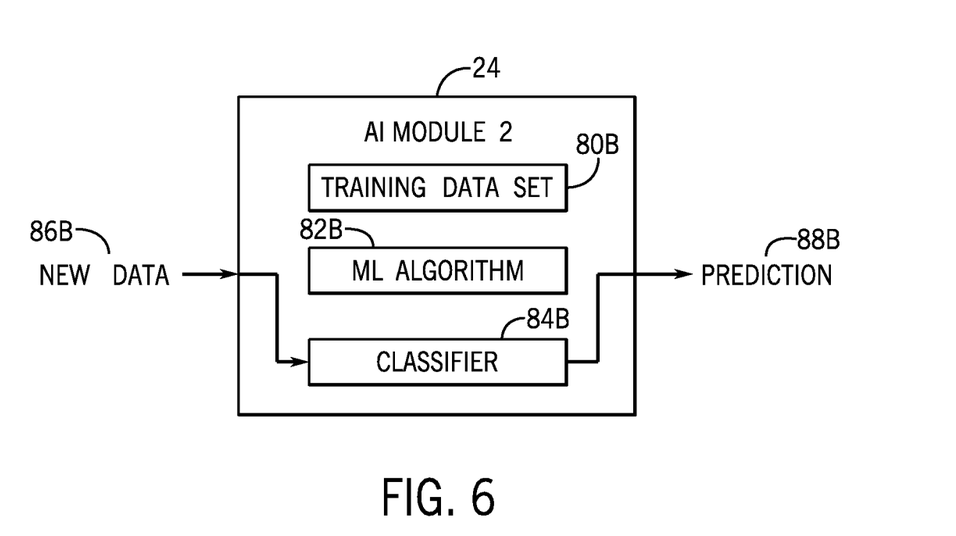
FIG. 6 illustrates a block diagram of a second artificial intelligence module for determining the disclosure provision feedback, in accordance with embodiments described herein.

FIG. 6 illustrates the second AI module 24 of FIG. 1 for determining the disclosure provision feedback 66 (e.g., the score 70, the recommendation 72 or area of improvement, and/or the score detail 74 of FIG. 4). The second AI module 24 may operate similarly to the first AI module 22 to make its determinations based on a machine learning algorithm. That is, the second AI module 24 may also include a training data set 80B, a machine learning algorithm 82B, and a classifier 84B that operate similar to the training data set 80A, the machine learning algorithm 82A, and the classifier 84A of the first AI module 22. However, training data set 80B may include historical or past disclosure readings 62 that resulted in a passing score 70, a failing score 70, and/or a particular percentage score 70.

The training data set 80B may be used to train the machine learning algorithm 82A to identify patterns and/or threshold pertaining to factors previously discussed (e.g., speed, proper annunciation of words, skipping words, etc.) that associate the reading to a particular disclosure provision feedback 66. Upon receiving new data 86B, which may include data associated with the ongoing customer-agent conversation, the classifier 84B may identify the same or similar patterns and/or data above the thresholds to classify the disclosure reading 62. That is, based on the reading delivery under each factor, the classifier 84B may output a prediction 88B of the provision feedback. For example, the classifier 84B may predict that the new data 86B is associated with the particular score 70 (e.g., overall or individual under each of the factors), the particular area of improvement 72, and/or the particular score detail 74. Thus, using the systems and methods described herein, disclosure statements to be provided to the customer 14 based on the context of the conversation may be determined in an efficient and effective manner. Moreover, using the systems and methods described herein, disclosure provision feedback may be determined in an efficient and effective manner.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A customer service system, comprising:
    an agent device associated with an agent; and
    a monitoring system, comprising:
        a memory configured to store instructions; and
        a processor configured to execute the instructions, wherein the instructions, when executed by the processor, cause the monitoring system to:
            monitor a conversation between a customer device associated with a customer and the agent device to identify a context of the conversation;
            identify, via a first machine learning algorithm, a disclosure notice based at least in part on the context of the conversation, wherein the first machine learning algorithm comprises a first neural network, a first Hidden Markov Model, or a combination thereof, wherein the first machine learning algorithm determines a first pattern, a first threshold number of keywords, or a combination thereof, to identify the disclosure notice as associated with the context of the conversation, wherein the first machine learning algorithm uses a first mathematical model based on training data, a first statistical model based on training data, or a combination thereof, wherein the disclosure notice comprises an indication of a disclosure to be read in light of the context of the conversation;
            iteratively train the first machine learning algorithm using the training data;
            provide a first indication of the disclosure notice to the agent device, wherein the agent device is configured to provide the first indication to the agent, by:
                receiving the first indication from the monitoring system; and
                rendering a graphical indication of the disclosure notice in a first graphical user interface (GUI) of the agent device based on the first indication;
            provide the disclosure notice to a second machine learning algorithm;
            monitor and evaluate, via the second machine learning algorithm, a disclosure provision of the disclosure notice from the agent to the customer, wherein the second machine learning algorithm uses past disclosure readings to determine a second pattern, a second threshold number of keywords, or a combination thereof, to assign a score to the disclosure provision; and
            provide a second indication of a disclosure provision feedback regarding evaluation of the disclosure provision to the agent, wherein the agent device is configured to provide the second indication, by:
                receiving the second indication from the monitoring system; and
                rendering the disclosure provision feedback in a second GUI of the agent device based on the second indication.

2. The customer service system of claim 1, wherein the first pattern, the first threshold, or the combination thereof, is based at least in part on one or more keywords, a weight associated with the one or more keywords, spacing between the one or more keywords, a combination of the one or more keywords, or any combination thereof.

3. The customer service system of claim 1, wherein the conversation comprises an ongoing conversation, a recorded conversation, or a combination thereof.

4. The customer service system of claim 1, wherein the monitoring system comprises one or more audio sensors to detect audio of the conversation, one or more display sensors to detect the first GUI on a display associated with the agent device, or a combination thereof.

5. The customer service system of claim 1, wherein the second machine learning algorithm references a database comprising a word dictionary, a thesaurus, or a combination thereof, to determine the disclosure provision feedback.

6. The customer service system of claim 1, wherein the processor determines one or more words spoken by the agent using phonemes in a context of other phonemes, machine learning, and a library of known words, phrases, and sentences.

7. The customer service system of claim 1, wherein the first pattern, the first threshold number of keywords, or the combination thereof, is based at least in part on one or more keywords, a weight associated with the one or more keywords, spacing between the one or more keywords, a combination of the one or more keywords, or any combination thereof.

8. The customer service system of claim 1, wherein the second pattern, the second threshold number of keywords, or the combination thereof, is based at least in part on a specific reading speed of keywords when reading the disclosure notice, an annunciation of keywords, skipped words, or a combination thereof.

9. The customer service system of claim 1, wherein the second machine learning algorithm comprises a second neural network, a second Hidden Markov Model, or a combination thereof, wherein the second machine learning algorithm uses a second mathematical model based on training data, a second statistical model based on training data, or a combination thereof.

10. A method, comprising:
monitoring a conversation between a customer device associated with a customer and an agent device associated with an agent in a customer service system to identify a context of the conversation;
identifying, via a first machine learning algorithm, a disclosure notice based at least in part on the context of the conversation, wherein the first machine learning algorithm comprises a neural network, a Hidden Markov Model, or a combination thereof, wherein the first machine learning algorithm determines a first pattern, a first threshold number of keywords, or a combination thereof, to identify the disclosure notice as associated with the context of the conversation, wherein the first machine learning algorithm uses a first mathematical model based on training data, a first statistical model based on training data, or a combination thereof, wherein the disclosure notice comprises an indication of a disclosure to be read in light of the context of the conversation;
iteratively training the first machine learning algorithm using the training data;
providing a first indication of the disclosure notice to the agent device, wherein the agent device is configured to provide the first indication to the agent, by:
receiving the first indication from a monitoring system; and
rendering the disclosure notice in a first graphical user interface (GUI) of the agent device based on the first indication;
providing the disclosure notice to a second machine learning algorithm;
monitoring a disclosure provision of the disclosure from the agent to the customer;
evaluating, via the second machine learning algorithm, the disclosure provision to identify whether the disclosure provision passes or fails a threshold quality level, wherein the second machine learning algorithm determines a second pattern, a second threshold number of keywords, or a combination thereof, to score the disclosure provision; and
providing a second indication of a disclosure provision feedback regarding evaluation of the disclosure provision to the agent, by:
receiving the second indication from the monitoring system; and
rendering the disclosure provision feedback in a second GUI of the agent device based on the second indication.

11. The method of claim 10, wherein the second pattern, the second threshold number of keywords, or the combination thereof, is based at least in part on factors comprising a reading of one or more keywords, annunciation of the one or more keywords, percentage or number of words read from a total number of words in the disclosure notice, percentage or number of substituted words that provide similar effect as original words, or any combination thereof.

12. The method of claim 11, comprising:
monitoring an action performed by the customer after the disclosure provision to identify an understanding measurement indicative of whether the customer understood the disclosure provision; and
scoring the disclosure provision based upon the understanding measurement.

13. The method of claim 10, wherein the evaluation comprises a scoring, the scoring comprising a percentage indication.

14. The method of claim 10, wherein the disclosure provision feedback comprises a recommendation, a score detail, or a combination thereof.

15. The method of claim 14, wherein the score detail comprises a plurality of individual scores of the disclosure provision each corresponding to a plurality of factors.

16. A tangible, non-transitory, computer-readable medium storing instructions executable by one or more processors, wherein the instructions, when executed, are configured to cause the one or more processors to:
monitor a conversation between a customer device associated with a customer and an agent device associated with an agent to identify a context of the conversation;
identify, via a first machine learning algorithm, a disclosure notice based at least in part on the context of the conversation, wherein the first machine learning algorithm comprises a neural network, a Hidden Markov Model, or a combination thereof, wherein the first machine learning algorithm determines a first pattern, a first threshold number of keywords, or a combination thereof, to identify the disclosure notice as associated with the context of the conversation, wherein the first machine learning algorithm uses a first mathematical model based on training data, a first statistical model based on training data, or a combination thereof, wherein the disclosure notice comprises an indication of a disclosure to be read in light of the context of the conversation;
iteratively train the first machine learning algorithm using the training data;
provide a first indication of the disclosure notice to the agent device, wherein the agent device is configured to provide the first indication to the agent, by:
receiving the first indication from a monitoring system; and
rendering the disclosure notice in a graphical user interface (GUI) of the agent device based on the first indication;
provide the disclosure notice to a second machine learning algorithm;
monitor and evaluate, via the second machine learning algorithm, a disclosure provision of the disclosure notice from the agent to the customer, wherein the second machine learning algorithm determines a second pattern, a second threshold number of keywords, or a combination thereof, to score the disclosure provision; and
provide a second indication of a disclosure provision feedback regarding evaluation of the disclosure provision to the agent, wherein the agent device is configured to provide the second indication, by:
receiving the second indication from the monitoring system; and
rendering the disclosure provision feedback in a second GUI of the agent device based on the second indication.

17. The computer-readable medium of claim 16, wherein the conversation comprises an audio communication, a text communication, an email communication, an online chat message communication, or a combination thereof.

18. The computer-readable medium of claim 16, wherein identifying the disclosure notice is based on machine learning that uses previous customer-agent conversations and corresponding disclosure notices as training data.

19. The computer-readable medium of claim 18, wherein the training data is used to predict the disclosure notice for new data associated with the conversation.

* * * * *